United States Patent [19]

Nordlof

[11] Patent Number: 4,578,621

[45] Date of Patent: Mar. 25, 1986

[54] STOCK ADVANCING APPARATUS WITH DANCER OPERATED POTENTIOMETER SPEED CONTROL

[76] Inventor: Richard D. Nordlof, 3312 Crest Rd., Rockford, Ill. 61107

[21] Appl. No.: 681,240

[22] Filed: Dec. 13, 1984

[51] Int. Cl.$^4$ .......................... H02P 7/00; G05B 1/06
[52] U.S. Cl. .......................................... 318/6; 318/348; 318/305; 318/674; 318/311; 318/643
[58] Field of Search ................ 318/6, 7, 11, 301, 305, 318/309, 310, 311, 317, 347, 348, 349, 257, 578, 663, 674

[56] References Cited

U.S. PATENT DOCUMENTS

| | | | |
|---|---|---|---|
| 2,750,546 | 6/1956 | Washburn | 318/643 X |
| 3,606,183 | 9/1971 | Turk | 318/6 |
| 3,683,246 | 8/1972 | Warshaw et al. | 318/6 |
| 3,910,521 | 10/1975 | O'Callaghan et al. | 318/6 X |
| 4,112,343 | 9/1978 | Douglas | 318/674 |
| 4,230,977 | 10/1980 | Nelson | 318/305 |
| 4,272,706 | 6/1981 | Somerville | 318/6 |
| 4,415,843 | 11/1983 | Feldman | 318/305 X |
| 4,426,605 | 1/1984 | Steinbrecher | 318/348 X |
| 4,471,278 | 9/1984 | Matouka | 318/257 X |
| 4,476,417 | 10/1984 | Zimmermann | 318/311 X |

Primary Examiner—Bernard Roskoski
Assistant Examiner—Shik Luen Paul Ip
Attorney, Agent, or Firm—Vernon J. Pillote

[57] ABSTRACT

A stock reel having a variable speed electric reel drive motor and a speed control potentiometer operated by a stock loop control arm for producing a variable control voltage correlative with the angular position of the control arm. The control voltage from the control potentiometer is compared with a reference voltage and an input voltage correlative in amplitude with the difference between the control voltage and the reference voltage is applied to a motor control unit to drive the motor when the control voltage exceeds the reference voltage. The reference voltage is selectively adjustable to vary the angular position at which the control voltage exceeds the reference voltage, to thereby adjust the operating angle of the control arm. The amplification of the input voltage applied to the motor control unit is adjustable to vary the range of control arm movement required to produce a preselected change in motor speed. Power switch means control the application of voltage to the control voltage divider and the reference voltage divider to enable payout and rewind of stock from either side of the stock reel.

17 Claims, 8 Drawing Figures

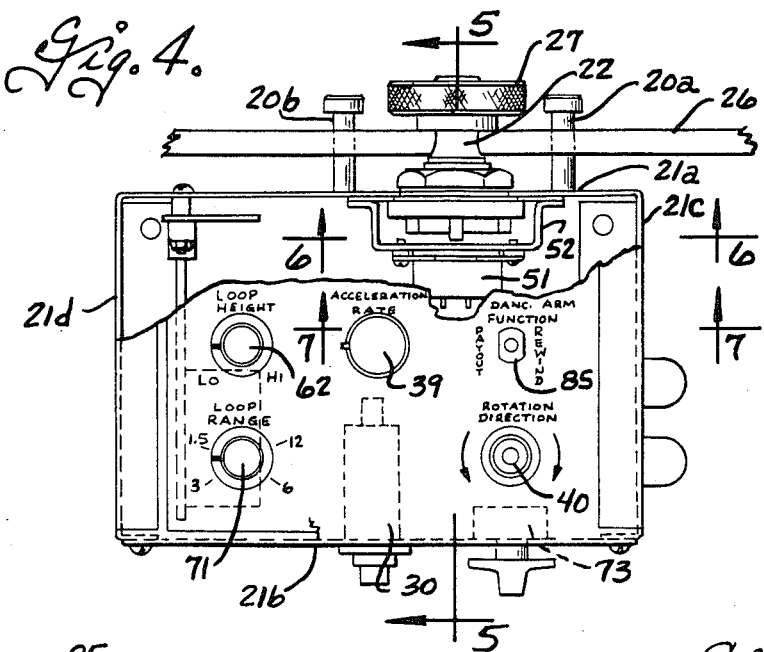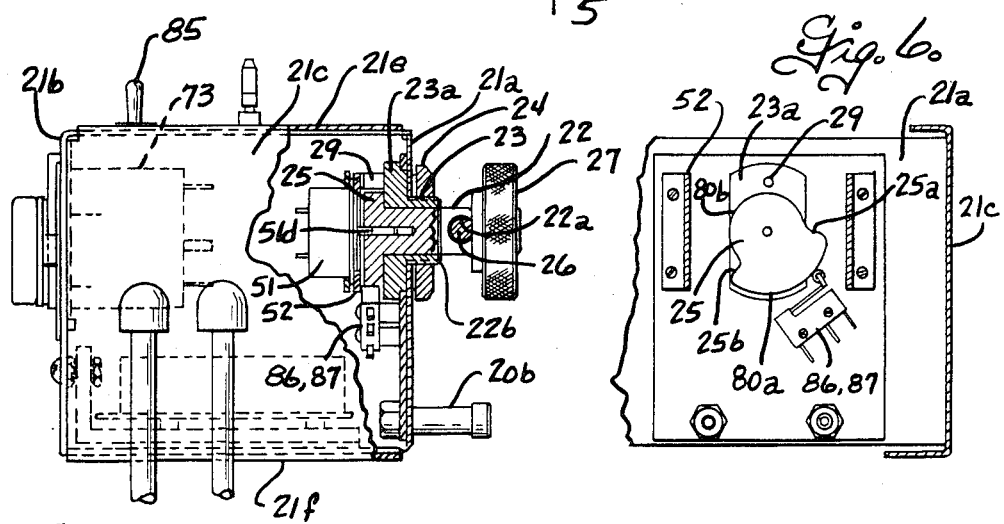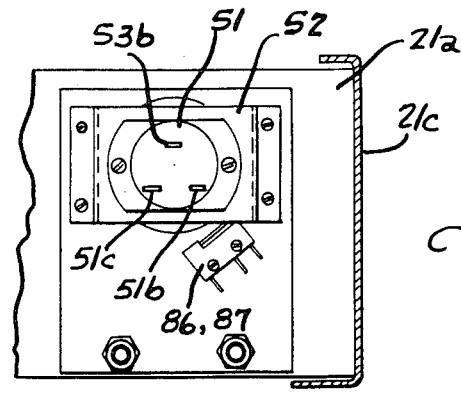

STOCK ADVANCING APPARATUS WITH DANCER OPERATED POTENTIOMETER SPEED CONTROL

BACKGROUND OF THE INVENTION

The present invention relates to power operated stock advancing apparatus of the type having a swingably mounted control arm for sensing the size of the stock loop and for actuating a speed control potentiometer to control operation of an electric drive motor. The stock advancing apparatus may comprise a stock reel that effects advance of the stock by winding or unwinding stock from a coil. The stock advancing apparatus can also comprise powered stock feed rollers or powered stock straightening rollers. In such power operated stock advancing apparatus it is desirable that the operating angle of the control arm be adjustable. In stock reels it is also desirable that they be adapted for operation with the control arm at either side of the reel, and that they be capable of either paying out or rewinding stock from either the top or bottom of the reel.

In prior stock reels known to the applicant, a lever on the control arm pivot shaft was arranged to operate the movable contact on a linear speed control potentiometer during rotation of the pivot shaft through a preselected angle. These prior art stock reels also had a manually operated control arm function switch and a manually operated control arm position switch for reversing the D.C. voltage applied to the potentiometer to adapt the stock reel for operation in either payout or rewind mode and also adapt the stock reel for operation with the control arm positioned on either side of the stock reel.

In these prior stock reels, the control arm was connected to the pivot shaft so that the control arm could be angularly adjusted relative to the shaft to change the operating angle of the control arm. However, it required considerable skill to change the operating angle by angularly adjusting the control arm relative to the pivot shaft. The operator had to apply a tool to the control arm pivot shaft; loosen the connection of the control arm to the pivot shaft; manipulate the tool to angularly position and hold the pivot shaft in the angular position at which the lever on the pivot shaft would position the movable contact on the potentiometer in a zero output voltage or null position; position and hold the control arm at the desired operating angle, and thereafter retighten the connection of the control arm to the shaft while holding both in the proper positions. Changing from the payout to rewind mode not only required operation of the payout-rewind switch, but also required readjusting of the angular position of the control arm relative to the pivot shaft since the zero output voltage position of the potentiometer in the rewind mode is different from that in the payout mode. In order to change the stock reel from operation with the control arm at one side of the reel to operation with the control arm at the other side of the reel, it was necessary to not only operate the manual control arm position switch, but to also disassemble the control arm from the pivot shaft and reassemble it with the control arm positioned at the other side of the stock reel, and to readjust the angular position of the control arm relative to the shaft in the manner previously described to a position that would be appropriate for operation at that side of the stock reel. A selectively operable motor rotation control switch was provided to enable reversing the direction of rotation of the drive motor, as required in different payout and rewind operation at different sides of the stock reel. The prior motor controls also commonly employed a manually adjustable potentiometer to adjust the percent of the maximum speed at which the reel would be driven in response to full output voltage from the speed control potentiometer, and some motor controls included a selectively adjustable acceleration control to adjust the rate of acceleration of the reel.

SUMMARY OF THE INVENTION

It is an object of the present invention to provide a stock advancing apparatus of the type having electric drive motor and a motor speed control potentiometer operated by a stock loop control arm, in which the operating angle of the control arm can be easily adjusted even while the stock reel is operating.

Another object of this invention is provide a stock advancing apparatus in accordance with the foregoing object and in which the range of angular movement of the control arm required to produce a preselected change in speed of the stock advancing apparatus can be adjusted.

Another object of this invention is to provide a stock advancing apparatus of the type having an electric drive motor and a motor speed control potentiometer operated by a stock loop control arm, and which automatically applies voltage of the proper polarity to the speed control potentiometer when the control arm is positioned at either side of the apparatus.

BRIEF DESCRIPTION OF THE DRAWINGS

FIG. 4 is a top view of the control unit for the stock advancing apparatus with parts broken away and shown in section to illustrate details of construction;

FIG. 5 is a fragmentary sectional view taken on the plane 5-5 of FIG. 4;

FIG. 6 is a fragmentary sectional view taken on the plane 6—6 of FIG. 4;

FIG. 7 is a fragmentary sectional view taken on the plane 7—7 of FIG. 4; and

The present invention relates to a stock advancing apparatus for advancing strips or wire stock of indeterminate length to maintain a predetermined slack loop in the stock. The stock advancing apparatus may comprise a stock reel which advances the stock by winding or unwinding the stock from a coil under the control of a stock loop sensing arm. The stock advancing apparatus can also comprise rotary stock feed rollers for feeding stock to or from a stock processing machine under the control of a stock loop sensing arm, or power driven stock straightening rollers operated under the control of a stock loop sensing arm. The stock advancing apparatus is of the type in which the control arm actuates a speed control potentiometer to vary the speed of an electric drive motor as required to maintain a slack loop in the stock. In the preferred embodiment herein illustrated and described, the stock advancing apparatus is a stock reel.

Figures 1, 2:
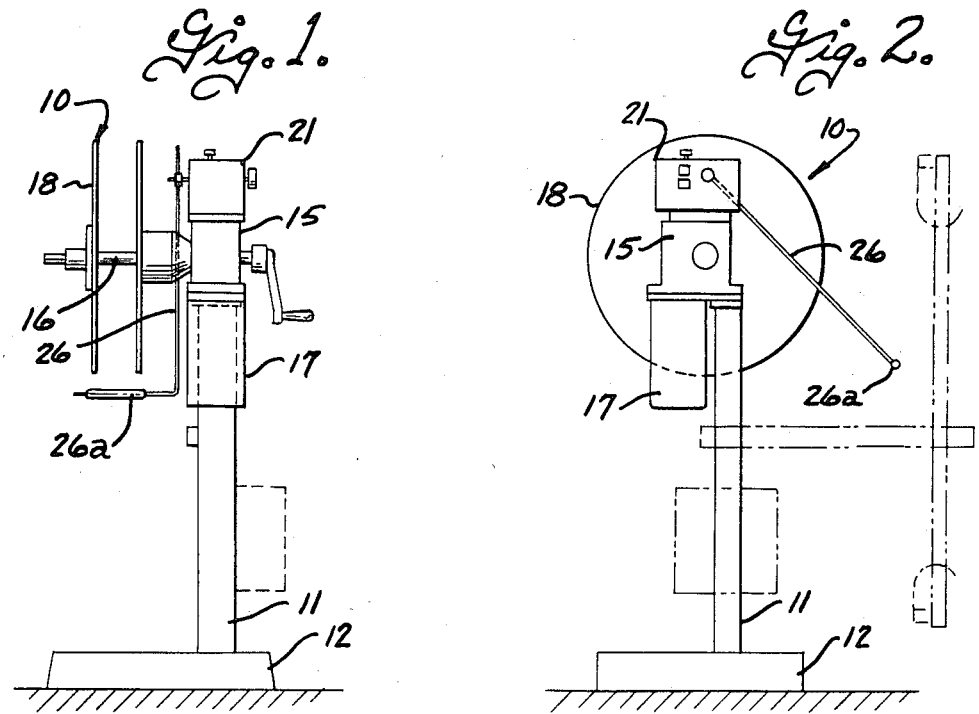
FIG. 1 is a side elevational view of a stock advancing apparatus embodying the present invention.
FIG. 2 is a front view of the stock reel of FIG. 1.
Figure 3:
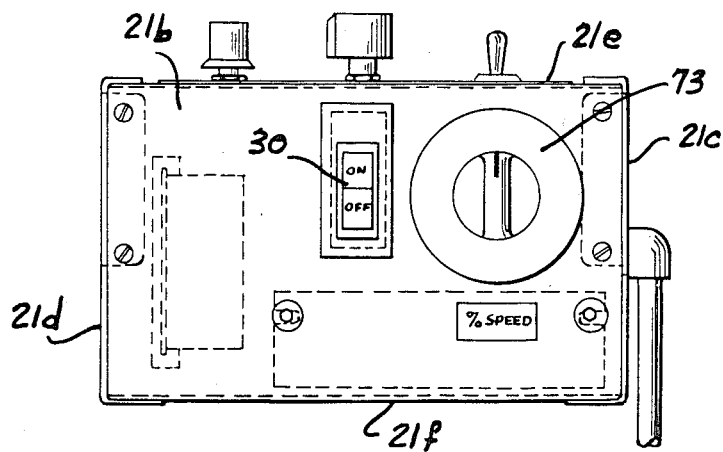
FIG. 3 is a side view of the control unit for stock advancing apparatus shown on a larger scale than FIG. 1.

The stock reel 10 is adapted to payout or rewind stock at either side of the stock reel, and from either the top or bottom of the coil, to supply stock or receive stock from a stock processing machine or apparatus (not shown) that performs some operation on the stock. The stock reel 10 is preferably self-supporting so that it can be moved into positions at the inlet or outlet side of the processing machine and, as shown in FIGS. 1 and 2 is mounted on the upper end of a post 11 having a floor engaging base 12. The stock reel includes a drive head 15 mounted on the upper end of of the post and a generally horizontal reel support shaft 16 that is rotatably supported in the drive head. The reel support shaft is reversibly driven by a reversible electric drive motor 17 attached to the drive head and the motor output shaft is connected through gearing (not shown) in the head to the reel drive shaft to rotate the same. A coil support 18 of any conventional construction suitable for supporting a coil of stock, is mounted on the reel support shaft 16 for rotation therewith.

A control box 21 is mounted on top of the drive head 15 and includes spaced side walls 21a, 21b, and end walls 21c and 21d and top and bottom walls 21e and 21f. A control arm pivot shaft 22 is rotatably mounted in a bushing 23 that extends through an opening in the side wall 21a. The bushing has a flange 23a at the inner end of the wall 21a, and the flanged bushing is non-rotatably clamped to the wall by a nut 24 threaded on the bushing. As best shown in FIG. 5, the control arm shaft 22 is constrained against axial movement by a flange 25 at its inner end that engages the inner side of the flange 23a on the bushing, and by a split ring 22b disposed in a groove in the control arm shaft, and which engages the outer end of the bushing. The control arm shaft 22 has a transverse bore 22a in the portion located outwardly of the bushing for slidably and non-rotatably receiving a control arm or dancer arm 26, and a thumb wheel 27 is threaded on the outer end of the shaft to engage the control arm and lock the same in a selected longitudinally adjusted position. The control arm has a laterally extending stock engaging portion 26a at its outer end and, commonly, the stock engaging portion is in the form of a small diameter roller that extends crosswise of the path of the stock as it enters or exits from the stock reel. The control arm is thus moved angularly about its pivot shaft 22 through a range of control arm positions as the stock loop increases and decreases in size. In order to permit payout and rewind from either side the stock reel, the control arm is arranged so that it can be selectively positioned at one side of the stock reel as shown in FIG. 2, and also at the other side of the stock reel. As shown in FIGS. 1 and 2, the control arm pivot shaft is located above the reel support shaft 16 and control arm stops 20a and 20b (FIGS. 4 and 5) are provided on the side wall 21a of the control box to prevent downward movement of the control arm below a preselected lower position when it is positioned at either side of the reel. The control arm can be adjusted lengthwise relative to the control arm shaft to change the effective length of the control arm while maintaining the control arm in a fixed angular relation with the control arm shaft. In order to assure that the control arm can be installed in only one angular position on the control arm shaft when positioned on either side of the stock reel, the flange 25 on the control arm shaft is provided with stop shoulders 25a, 25b that are arranged to engage a stop pin 29 on the bushing flange 23a. The stop shoulders 25a, 25b are angularly spaced apart a distance to allow the control arm to move through a first range of control arm positions when positioned at one side of the stock reel, and through a second range of control arm positions when positioned at the other side of the stock reel.

Figure 8:
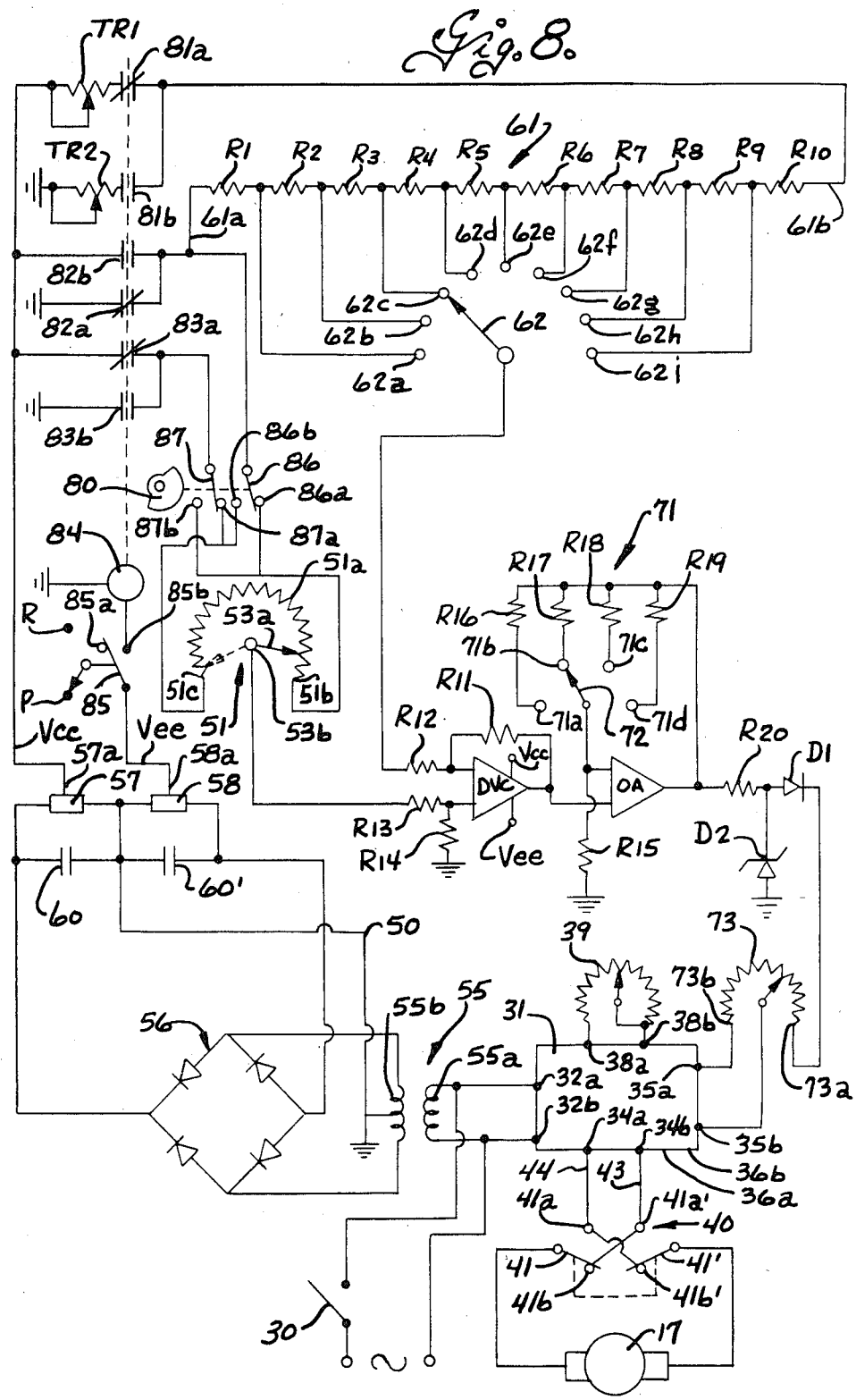
FIG. 8 is a schematic electrical diagram of the control unit.

The reel drive motor 17 is a reversible electric drive motor to enable rotation of the reel in either direction and is preferably a DC electric motor that can be reversibly operated on direct current such as a permanent-magnet motor or a shunt wound DC motor. A DC motor speed control 31 is provided for the motor 17 and, as schematically shown in FIG. 8, the motor speed control has power supply terminals 32a, 32b connected through a power switch 30 to a source of power such as an AC power line, and output terminals 34a and 34b arranged to be connected to the reversible DC motor 17. The DC motor speed control also has input terminals 35a, 35b, and the motor speed control is arranged to produce an output voltage at the output terminals 34a, 34b that is correlative in amplitude with the amplitude of the input signal applied to the input terminals. DC motor speed controls suitable for use in controlling operation of fractional horsepower DC motors such as are used for driving the stock reel are well known and commercially available from various different manufacturers. The motor speed control may, for example, be of the type sold by KB Electronics Inc., of Brooklyn, N.Y. under the tradename KBIC Solid State DC Motor speed control. Such motor speed controls can be used with either permanent-magnet or shunt wound DC motors, with armature output terminals 34a, 34b arranged for connection to the armature of the motor and field output terminals 36a and 36b arranged for connection to the field of a D.C. shunt motor. In the embodiment illustrated in FIG. 8, the motor 17 is of the permanent-magnet type and the field terminals 36a and 36b of the motor control 31 are not used. These motor speed controls are also available with a controlled acceleration circuit to control the rate of acceleration of the drive motor. The controlled acceleration circuit can include an adjustable potentiometer 39 which, as shown in FIG. 8, is connected to the controlled acceleration circuitry in the motor speed control 31 through terminals 38a and 38b to provide a selectively variable motor acceleration control. The controlled acceleration circuit operates each time the input signal applied to input terminal 35b is increased and the potentiometer 39 can be utilized to adjust the acceleration rate of the reel drive motor. The voltage at the output terminals 34a and 34b of the DC motor control varies in amplitude with the amplitude of the DC signal or voltage applied to the input terminals 35a and 35b, but does not change polarity. A polarity reversing switch 40 is provided for reversing the polarity of the voltage applied to the armature of the motor and, as diagrammatically shown FIG. 8, the polarity reversing switch includes switch members 41, 41' connected to the armature of the motor and respectively movable from a position engaging contacts 41b and 41b' to a position engaging contacts 41a, 41a'. Contacts 41a' and 41b are connected through conductor 43 to output terminal 34b and contacts 41a, 41b' are connected through conductor 44 to the output terminal 34a of the motor control. Details of the circuitry used in such commercially available DC motor controls forms no part of the present invention and further detailed description is deemed unnecessary.

A control potentiometer or voltage divider 51 is mounted as by a bracket 52 on the side wall 21a of the control box, and the potentiometer has an input shaft 51d non-rotatably keyed to the control arm shaft 22 for rotation with the control arm shaft. The control voltage divider 51 is preferably an instrument grade potentiometer having an arcuate resistor 51a (FIG. 8) that extends between end terminals 51b and 51c, and a movable contact 53a that is connected to the input shaft 51d and which is movable angularly with the input shaft and along the arcuate resistor 51a to vary the voltage at the output terminal 53b connected to the movable contact.

The control voltage divider 51 is connected in an input signal control circuit which is arranged to supply a control signal across the input terminals 35a, 35b of the motor speed control 31. A DC power supply is provided for the input signal control circuit and includes a transformer 55 having a primary winding 55a connected to the AC power supply line and a center-tapped secondary winding 55b connected to a full wave bridge rectifier 56. The center tap on the secondary winding 55b is connected to a grounded line 50 and the full wave rectifier has positive and negative output lines 50a and 50b; respectively. A resistor 57 having an adjustable tap 57a is connected between the positive output line 50a of the bridge rectifier and the grounded line 50 to provide a positive output voltage Vcc at its output terminal 57a, and a resistor 58 having an adjustable tap 58a is connected between the negative line 50b of the bridge rectifier and the grounded line 50b to provide a negative output voltage Vee at its output terminal 58a. Filter capacitors 60 and 60' are connected in parallel with the resistors 58 and 59 and the taps on the resistors 58 and 59 are adjusted to provide a voltage of the desired amplitude, for example 12 volts.

A reference voltage divider 61 having a movable contact 62, provides a selectively adjustable reference voltage. As diagrammatically shown in FIG. 8, the reference voltage divider 61 has end terminals 61a and 61b, and a plurality of resistances, herein shown ten in number and designated R1-R10. Taps between the resistances are connected through conductors to contacts 62a-62i of a multiposition switch having the movable contact 62. The movable contact 62 is movable into engagement with different contacts to vary the amplitude of the reference voltage. A comparator circuit is provided for comparing the control voltage appearing at the movable contact 53a of the control arm voltage divider with the reference voltage appearing at the movable contact 62 of the reference voltage divider, and for applying an input voltage to the input terminals 35a, 35b of the motor control that is correlative in amplitude with the amount by which the control arm voltage exceeds the reference voltage. For this purpose, the reference voltage is applied through a resistor R12 to the inverting input terminal of a differential amplifier or differential voltage comparator DVC and the control arm voltage is applied through a resistor R13 and across resistor R14 to the non-inverting input terminal of the differential amplifier. A feedback resistor R11 is connected from the output terminal of the differential amplifier DVC back to the non-inverting input terminal. The differential amplifier compares the reference voltage and the control arm voltage applied to its input terminals and produces an output voltage at its output terminal that is correlative in amplitude with the difference in the amplitude of the control arm voltage and the reference voltage. The voltage output of the differential amplifier DVC is applied to the non-inverting input of an operational amplifier OA and provision is made for selectively adjusting the gain of the amplifier OA. As shown in FIG. 8, the output terminal of the operational amplifier OA is connected through a selectively adjustable feedback circuit 71 to the inverting input terminal of the operational amplifier OA, which inverting input terminal is otherwise connected through resistor R15 to ground. The selectively adjustable feedback circuit includes a plurality of resistors herein shown four in number and designated R16, R17, R18 and R19 and which are respectively connected to contacts 71a, 71b, 71c and 71d of a multiposition switch having a movable contact 72. The movable contact 72 is connected to the inverting input terminal of amplifier OA and the movable contact 72 can selectively connect the resistors R16-R19 in the feedback circuit. With this arrangement, the voltage output of the operational amplifier OA can be expressed by the following equation:

$$V\,out = V\,in\,(RX + R15)/R15$$

Where Rx is that one of the resistors R16-R19 that is connected by the switch into the feedback circuit. The output of the operational amplifier is connected through a resistor R20 and a diode D1 to one terminal 73a of a manually adjustable potentiometer 73. The other terminal 73b of the potentiometer 73 is connected to one input terminal 35a of the motor control 31 and the movable contact of the potentiometer 73 is connected to the other input terminal 35b of the motor control unit. A zener diode D2 is connected from the load resistor to ground. With this arrangement only positive output voltages from the operational amplifier OA are applied to the input terminal 35b of the motor control unit 31 and potentiometer 73 is adjustable to control the amplitude of the input voltage. Manual adjustment of potentiometer 73 changes the portion of the voltage from the output of the operational amplifier OA that is applied to the input terminal 35b of the motor speed control and thus adjusts the percent of maximum speed at which the reel drive motor is operated. By way of example, the components of the input control circuit may have the following values:

| | |
|---|---|
| R1 | 620 ohms |
| R-2-R9 | 270 ohms |
| R10 | 3.3K ohms |
| R11-R14 | 100K ohms |
| R15 | 9.1K ohms |
| R16 | 46.4K ohms |
| R17 | 95.3K ohms |
| R18 | 178K ohms |
| R19 | 316K ohms |
| R20 | 1620 ohms |
| TR1, TR2 | 5K trim pot |
| 51 | 10K ohm potentiometer |
| 73 | 5K ohm potentiometer |
| 39 | 20K ohm potentiometer |
| DVC | Motorola LM 358 OP-amp |

During payout of stock from the stock reel, the motor speed must increase in response to the raising of the control arm and during rewind the motor speed must be increased in response of lowering of the control arm. However, raising of the control arm produces a counterclockwise rotation of the control potentiometer 51 when the control arm is at one side of the stock reel and raising of the control arm produces a clockwise rotation of the potentiometer when the control arm is raised at the other side of the stock reel. A power switch means is provided for controling application of DC voltage to the control voltage divider 51 and to the reference voltage divider 61. A first switch actuator means that is movable between a payout and a rewind position, is provided for operating the power switch means, and a second switch actuator means that is movable between a dancer arm right position and a dancer arm left position, is also provided for operating the power switch means. As shown in FIG. 8, the power switch means includes relay contacts 81a, 81b, 82a, 82b, 83a and 83b operated by a control relay 84. Control relay 84 is selectively energized under the control of a payout-rewind switch 85 movable between a payout position P engaging contact 85a in which the control relay is de-energized and a rewind position R engaging contact 85b to energize the control relay. Relay contacts 81a, 82a and 83a are normally closed and are moved to their open position when their control relay is energized, and relay contacts 81b, 82b and 83b are normally open and are moved to their closed position when their control relay is energized. One terminal 61a of the reference voltage divider 61 is connected through relay contact 82a to ground and through relay contact 82b to the positive voltage supply VCC of the power supply. The other terminal 61b of the voltage divider 61 is connected through relay contacts 81a and adjustable trim pot TR1 to the positive voltage supply VCC and through relay contacts 81b and adjustable trim pot TR2 to ground. The power switch means also includes switches 86 and 87 which are movable in unison between a position engaging contacts 86a, 87a respectively to a position engaging contacts 86b, 87b respectively. Switches 86 and 87 are conveniently actuated by a cam 80 movable with the dancer arm shaft and which operates to position the switches in engagement with contacts 86a, 87a when the dancer arm is at one side of the stock reel, and to position the switches in engagement with contacts 86b, 87b when the dancer arm is in the opposite side of the stock reel. Switch 86 is connected through relay contact 82b with the positive voltage supply Vcc and through relay contact 82a to ground. Switch 87 is connected through relay contacts 83a to the positive voltage supply Vcc and through contact 83b to ground. The cam 80 for operating the switches 86 and 87 can conveniently be formed on the flange 25 of the dancer arm shaft. As shown in FIG. 6, the flange 25 is provided with a raised lobe portion 80a and a recessed portion 80b. The raised lobe portion is arranged to engage the switches 86, 87 to move them to one position and hold it in that position during movement of the dancer arm through a first range of positions when the dancer arm is at one side of the stock reel, and the recessed portion 85d is arranged to engage the actuator for switches 86 and 87 and allow the switches to move to a second position, when the dancer arm moves through a range of positions at the other side of the stock reel.

From the foregoing it is believed that the construction and operation of the stock reel will be readily understood. The operating angle of the dancer arm is preferably made adjustable from an angle in which the arm extends downwardly at an angle of about 30° to the vertical to an angle of about 90° to the vertical. The control voltage divider 51 has an arcuate extent of about 330° and, when the control arm is positioned at one side of the stock reel at an angle of about 30° to the vertical, the movable contact 53a will be positioned adjacent one end 51b of the control voltage divider, and when the control arm is positioned at the other side of the stock reel at an angle of about 30° to the vertical, the movable contact will be positioned adjacent the other end 51c of the control voltage divider. More specifically, when the control arm is positioned to one side such as the right of the stock reel, the switch actuator 80 operates switches 86 and 87 into engagement with contacts 86a and 87a. Assuming first that the payout-rewind actuator is in its payout position P, control relay 84 will be de-energized and contacts 81a, 82a and 83a will be closed. Contact 81a connects a positive voltage source Vcc to the end 61b of reference voltage divider 61 and contact 82a connects the other end 61a of the reference voltage divider to ground. Contact 82a also connects the switch 86 to ground and contact 83b connects the switch 87 to the positive voltage source VCC. Thus, in the payout position when the control arm is at the right side of the stock reel, the positive voltage source is connected to the end 51c of the control voltage divider and to the end 61a of the reference voltage divider. As the movable contacts 53a on the voltage divider move upwardly from the position shown in solid lines in FIG. 8 in response to upward movement of the control arm, the voltage at the movable contact will increase. When the voltage at the movable contact at the control voltage divider is below the voltage at the movable contact of the reference voltage divider, the output of the differential amplifier will be negative and diode D1 blocks flow of an input signal to the input terminal 35b of the motor control. When the voltage at the movable contact of the control voltage divider rises above the reference voltage, the positive output voltage passes through diode D1 and adjustable potentiometer 73 to the input terminal 35b of the motor control unit to produce an output voltage at the output terminals 34a, 34b correlative in amplitude with the amount by which the control voltage exceeds the reference voltage. When the dancer arm is moved to a position at the other side of the stock reel, the movable contact of the control voltage divider will be adjacent the end 51c as shown in dotted lines in FIG. 8. The dancer arm position switch actuator 80 moves the switches 86 and 87 into positions engaging contacts 86b and 87b respectively to connect end 51c of the control voltage divider to ground and to apply voltage Vcc to the end 51b. Thus, when the control arm is at the other or left side of the stock reel, the voltage at the movable contact of the control voltage divider will increase as the control arm moves upwardly. When the control voltage again exceeds the reference voltage, it will apply an input signal to the input terminal 35b of the motor control unit correlative with the amount by which the control voltage exceeds the reference voltage to drive the reel drive motor. The angular position at which the control voltage exceeds the reference voltage can be adjusted by adjusting the movable contact 62 of the reference voltage divider. Conveniently, the reference voltage divider is calibrated in terms of the approximate operating angle of the dancer arm at which the control voltage will exceed the reference voltage.

The direction of rotation of the reel for payout of stock is dependent on whether the stock is being paid out to the left or to the right of the stock reel and also whether the stock is being paid out from the top or the bottom of the stock reel. The motor reversing switch 40 can be manually positioned to operate the motor and the stock reel in the desired direction. The adjustable gain control can be adjusted to adjust the amount of change in the control voltage and hence the amount of movement of the control arm required to produce a preselected change in the speed of the motor. This enables adjustment of the range of movement of the control arm required to operate the reel from zero speed to the maximum speed necessary to pay out or rewind stock at the rate required by the subsequent processing machine. Potentiometer 73 is selectively adjustable to adjust the percent of maximum speed.

When the payout rewind actuator is moved to its rewind position, it energizes relay 84 and opens contacts 81a, 82a and 83a and closes contacts 81b, 82b and 83b. Thus, if the control arm is positioned at the right side of the stock reel, the movable contact 53a of the control voltage divider will be nearer the end 51b of the control voltage divider as shown in solid lines in FIG. 8. Contacts 82b apply voltage Vcc through switch 86 to the end 51b of the control voltage divider so that the control voltage at the movable contact 53a will increase toward full voltage Vcc as it moves toward the end 51b. However, relay contact 82b also applies the voltage Vcc to the end 61a of the reference voltage divider so that the voltage at contacts 52b is a preselected amount below full voltage Vcc. Thus, as the control arm moves downwardly to a position in which the control voltage exceeds the reference voltage, it will apply an input signal to terminal 35b of the motor control unit 31 to increase the speed of the motor. Movement of the control arm to the other side of the stock reel moves the movable contact 53a of the control voltage divider toward the end 51c as shown in dotted lines in FIG. 8, and the dancer arm position switch actuator 80 moves the switches 86 and 87 into engagement with contacts 86b and 87b so that voltage Vcc is applied to the end 51c of the control voltage divider. Thus, the voltage at the movable contact of the control voltage divider will increase as the control arm moves downwardly to increase the speed of the motor when the control voltage exceeds the reference voltage.

The embodiments of the invention in which an exclusive property or privilege is claimed are defined as follows:

1. A stock advancing apparatus comprising, a support, rotary stock advancing means on the support, an electric drive motor for driving the rotary stock advancing means, motor control means having an output circuit connected to the drive motor and an input circuit, said motor control means being operative to energize and drive the drive motor at a speed correlative with the amplitude of an input voltage applied to its input circuit, a stock loop control arm mounted for swinging movement about an axis through a range of control arm positions, a control voltage divider having a movable contact, means for applying a DC voltage to the control voltage divider, means operatively connecting the movable contact of the control voltage divider to the control arm for movement therewith to produce a control arm voltage at its movable contact correlative in amplitude with the angular position of the loop control arm, reference voltage means for producing a DC reference voltage, and means responsive to said control arm voltage and said reference voltage for applying an input voltage to the input circuit of the motor control means correlative in amplitude with the amount by which the control arm voltage exceeds the reference voltage, and selectively adjustable means for changing the amplitude of the reference voltage to change the angular position of the control arm at which the motor is energized to drive the stock reel.

2. A stock advancing apparatus according to claim 1 wherein said reference voltage means includes a reference voltage divider having a selectively movable contact, and means for applying a DC voltage to said reference voltage divider.

3. A stock advancing apparatus according to claim 1 wherein the control arm is movable through a first range of positions at one side of the apparatus and through a second range of positions at the other side of the apparatus, said means for applying a DC voltage to the control voltage divider including means for reversing the polarity of the voltage applied to the control voltage divider.

4. A stock advancing apparatus according to claim 1 wherein the control arm is movable through a first range of positions at one side of the apparatus and through a second range of positions at the other side of the apparatus, said means for applying a DC voltage to the control voltage divider including means for applying voltage of one polarity when the control arm is in the first range of positions and means for applying voltage of the opposite polarity when the control arm is in said second range of positions.

5. A stock advancing apparatus according to claim 1 wherein the control arm is movable through a first range of positions at one side of the apparatus and through a second range of positions at the other side of the apparatus, said means for applying a DC voltage to the control voltage divider including control arm position sensing means operative when the control arm is in said first range of positions for applying voltage of one polarity to the control voltage divider and operative when the control arm is in said second range of positions for applying voltage of opposite polarity to the control voltage divider.

6. A stock advancing apparatus according to claim 1 wherein said means for applying said control voltage to the input circuit of the motor control means includes an adjustable-gain amplifier having a selectively adjustable gain control to change the range of control arm movement required to produce a preselected change in the input voltage.

7. A stock advancing apparatus according to claim 1 wherein said reference voltage means includes a reference voltage divider having a selectively movable contact, means for applying a DC voltage to the reference voltage divider, means for reversing the polarity of the voltage applied to the reference voltage divider, and means for reversing the polarity of the voltage applied to the control voltage divider.

8. A stock advancing apparatus comprising a support, rotary stock advancing means on the support, an electric drive motor for driving the stock advancing means, motor control means having an output circuit connected to the rotary stock advancing means operative to energize and drive the drive motor at a speed correlative with the amplitude of an input voltage applied to its input circuit, a stock loop control arm mounted for swinging movement about an axis through a first range of positions at one side of the apparatus and through a second range of positions at the other side of the apparatus, a control voltage divider having an angularly movable contact, means operatively connecting the movable contact of the control voltage divider to the control arm for angular movement therewith, means for applying a DC voltage to the control voltage divider, and means including switch means operative to one condition to apply DC voltage of one polarity to the control voltage divider to produce a control arm voltage at the control contact that increases as the control arm is raised in said first range of positions, said switch means being operative to a second condition to apply DC voltage of the opposite polarity to the control voltage divider to produce a control arm voltage that increases as the control arm is raised in said second range of positions, means connected to the control voltage divider for applying an input voltage to the motor control, and cam means on said control arm for operating said switch means to said one condition when the control arm is in said first range of positions and for operating said switch means to said second condition when the control arm is in said second range of positions.

9. A stock advancing apparatus comprising, a support, rotary stock advancing means on the reel support, an electric drive motor for driving the stock advancing means, motor control means having an output circuit connected to the drive motor and an input circuit, said motor control means being operative to energize and drive the drive motor at a speed correlative with the amplitude of an input voltage applied to its input circuit, a stock loop control arm mounted for swinging movement about an axis through a range of control arm positions, a control voltage divider having an angularly movable contact, means operatively connecting the movable contact of the control voltage divider to the control arm for angular movement therewith, DC voltage supply means, power switch means controlling application of DC voltage to the control voltage divider, the power switch means being operable to a first condition for applying a DC voltage of one polarity to the control voltage divider to produce a control arm voltage at the movable contact that increases as the control arm moves upwardly in said range of control arm positions, the power switch means being operable to a second condition for applying DC voltage of the opposite polarity to the control voltage divider to produce a control arm voltage at the movable contact that increases as the control arm moves downwardly in said range of positions, reference voltage means for producing a reference voltage, said reference voltage means being operable to a first condition to produce a reference voltage correlative in amplitude with the control arm voltage at a selected angular position of the control arm when the power switch means is in said one condition, said reference voltage means being operable to a second condition produce a reference voltage correlative in amplitude with the control arm voltage at a selected angular position of the control arm when the power switch means is in said second condition, means responsive to said control arm voltage and to said reference voltage means for applying an input voltage to the input circuit of the motor control means correlative in amplitude with the amount by which the control arm voltage exceeds the reference voltage.

10. A stock advancing apparatus according to claim 9 including selectively adjustable means for changing the amplitude of the reference voltage to change the angular position of the control arm at which the motor is energized to drive the stock reel.

11. A stock advancing apparatus according to claim 10 wherein said means for applying an input voltage to the input circuit of the motor control means includes an adjustable gain amplifier having a selectively adjustable gain control to change the range of control arm movement required to produce a preselected change in the control voltage.

12. A stock advancing apparatus according to claim 10 wherein said means for producing a reference voltage includes a reference voltage having a movable contact, and switch means for reversibly applying voltage from the DC voltage supply means to said reference voltage divider.

13. A stock reel comprising, a reel support, stock reel means for mounting a coil of stock on the reel support for rotation about a generally horizontal axis, an electric reel drive motor for driving the stock reel, motor control means having an output circuit connected to the reel drive motor, the motor control means being operative to energize and drive the reel drive motor at a speed correlative with the amplitude of a control signal applied to its input circuit, a stock loop control arm mounted for swinging movement about a generally horizontal axis through a first range of positions at one side of the stock reel and through a second range of positions at the other side of the stock reel, a control voltage divider having an angularly movable contact, means operatively connecting the movable contact of the control voltage divider to the control arm for angular movement therewith, a reference voltage divider having a movable contact, power switch means for controlling application of DC voltage to the control voltage divider and to the reference voltage divider, a first actuator means movable between a payout and a rewind position for operating said power switch means, a second actuator movable between a control arm right position and a control arm left position for operating said power switch means, said first and second actuator means being operative:

(a) when the first actuator means is in its payout position and said second actuator means is in its control arm right position to apply DC voltage to the control voltage divider of a polarity to produce a control arm voltage at its movable contact that increases as the control arm is raised in said first range of positions and to apply DC voltage to the reference voltage divider of a polarity to produce a reference voltage at its movable contact that is correlative in amplitude with the control arm voltage at a selected angular position of the control arm in said first range of control arm positions;

(b) when the first actuator means is in its rewind position and said second actuator means is in its control arm right position, to apply DC voltage to the control voltage divider of a polarity to produce a control arm voltage that increases as the control arm is lowered in said first range of positions and to apply a DC voltage to the reference voltage divider of a polarity to produce a reference voltage at its movable contact that is correlative with the control arm voltage at a selected angular position of the control arm in said first range of control arm positions;

(c) when the first actuator means is in its payout position and the second actuator means is in its control arm left position, to apply DC voltage to the control voltage divider of a polarity to produce a control arm voltage at its movable contact that increases as the control arm is raised in said second range of positions and to apply DC voltage to the reference voltage divider of a polarity to produce a reference voltage at its movable contact that is correlative with the control arm voltage at a selected angular position of the control arm in said second range of control arm positions;

(d) when the first actuator means is in its rewind position and the second actuator means is in its control arm left position, to apply DC voltage to the control voltage divider of a polarity to produce a control voltage at its movable contact that increases as the control arm is lowered in said second range of positions and to apply DC voltage to the reference voltage divider of a polarity to produce a reference voltage at its movable contact that is correlative with the control arm voltage at a selected angular position of the control arm in said second range of control arm positions;

and means operatively connected to the movable contact of the control voltage divider and to the movable contact of the reference voltage divider for applying an input voltage to the input circuit of the motor control means correlative in amplitude with the amount by which the control arm voltage exceeds the reference voltage.

14. A stock reel according to claim 13 including selectively adjustable means for changing the amplitude of the reference voltage to change the angular position of the control arm at which the motor is energized to drive the stock reel.

15. A stock reel according to claim 14 wherein said means for applying an input voltage to the input circuit of the motor control means includes an adjustable gain amplifier having a selectively adjustable gain control to change the range of control arm movement required to produce a preselected change in the control voltage.

16. A stock reel according to claim 13 wherein said means for applying an input voltage to the input circuit of the motor control means includes an adjustable gain amplifier having a selectively adjustable gain control to change the range of control arm movement required to produce a preselected change in the control voltage.

17. A stock reel according to claim 13 including selectively operable motor reversing switch for reversing the polarity of the output voltage applied from the output circuit of the motor control means to the reel drive motor.

* * * * *

UNITED STATES PATENT AND TRADEMARK OFFICE
CERTIFICATE OF CORRECTION

PATENT NO. : 4,578,621
DATED : March 25, 1986
INVENTOR(S) : Richard D. Nordlof

It is certified that error appears in the above-identified patent and that said Letters Patent are hereby corrected as shown below:

Column 12, line 5, insert -- divider -- before "having".

Signed and Sealed this

Eighth Day of July 1986

[SEAL]

Attest:

DONALD J. QUIGG

Attesting Officer

Commissioner of Patents and Trademarks